(12) United States Patent
Park et al.

(10) Patent No.: US 6,521,006 B2
(45) Date of Patent: Feb. 18, 2003

(54) VACUUM CLEANER

(75) Inventors: Kyu-Chang Park, Kwangju (KR); Jang-Keun Oh, Kwangju (KR); Jeong-Gon Song, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 9 days.

(21) Appl. No.: 09/753,455

(22) Filed: Jan. 4, 2001

(65) Prior Publication Data

US 2001/0049928 A1 Dec. 13, 2001

(30) Foreign Application Priority Data

Jan. 22, 2000 (KR) .......................................... 2000/3125

(51) Int. Cl.$^7$ .............................................. B01D 46/02
(52) U.S. Cl. .................. 55/337; 55/459.1; 55/459.2; 55/459.4; 55/473; 55/520; 55/DIG. 3; 15/352; 15/353
(58) Field of Search ................. 55/337, 459.1, 55/459.2, 459.4, 471, 473, 520, DIG. 3; 15/352, 353

(56) References Cited

U.S. PATENT DOCUMENTS 5,188,644 A * 2/1993 Landy ........................ 55/473

FOREIGN PATENT DOCUMENTS

| DE | 174063 C | 8/1906 |
|---|---|---|
| DE | 653165 C | 11/1937 |
| DE | 199 38 769 A1 | 3/2001 |
| EP | 0966912 A1 | 6/1999 |
| EP | 1023864 A2 | 1/2000 |
| EP | 1 023 864 A2 | 8/2000 |
| KR | 10-1999-0055954 | 6/2001 |
| WO | WO00/64321 | 11/2000 |

OTHER PUBLICATIONS

British Patent Office Combined Search and Examination Report, dated Oct. 5, 2000.
Office Action dated Nov. 9, 2001 issued by the German Patent Office in corresponding German patent application No. 100 35 253.7–15 filed on the Jul. 20, 2000. (*with English translation*).

* cited by examiner

*Primary Examiner*—David A. Simmons
*Assistant Examiner*—Minh-Chau T. Pham
(74) *Attorney, Agent, or Firm*—Robert E. Bushnell, Esq.

(57) ABSTRACT

A vacuum cleaner capable of efficiently separating and eliminating dust and dirt is provided. The vacuum cleaner including a body having open and closed spaces divided by a partition, a suction brush connecting port formed on the upper side of the body and interconnected with the open space, an interconnecting hole formed on the partition for interconnecting the open and closed spaces, a motor mounted in the closed space of the body for generating a suction force, and a dirt collecting unit detachably mounted in the open space of the body for centrifugally separating dirt and dust contained in the air sucked in through the suction brush connecting port by the motor. The dirt collecting means includes an outer casing having an air inlet and outlet which respectively correspond to the suction brush connecting port and the interconnecting hole, a cylindrical filter rotatably mounted on the outer casing by a rotational supporting member and having one closed end and a plurality of air holes formed along the outer circumference, at least four rotating wings formed on the filter for rotating the filter with air current which flows in through the air inlet, and a dirt collecting container detachably formed on the outer casing to house the filter.

23 Claims, 5 Drawing Sheets

VACUUM CLEANER

CLAIM OF PRIORITY

This application makes reference to, incorporates the same herein, and claims all benefits accruing under 35 U.S.C. §119 from applications for VACUUM CLEANER earlier filed in the Korean Industrial Property Office on the 22nd of Jan. 2000 and there duly assigned Ser. No. 3125/2000.

BACKGROUND OF THE INVENTION

1. Field of the Invention

The present invention relates to a vacuum cleaner, and more particularly, to a vacuum cleaner having a filter rotatably mounted on a body of the vacuum cleaner.

2. Description of the Prior Art

Generally, a vacuum cleaner has a separable dust bag mounted in a dust chamber of a body of the vacuum cleaner. The dust bag collects dirt and dust contained in air which is sucked up by a motor into the dust chamber through a suction port of the vacuum cleaner. The vacuum cleaner employs a filter fixed to the body for filtration of the air. However, the dirt and dust stick to the filter and block up the air flow within the vacuum cleaner. As the amount of dirt and dust collected in the dust bag and stuck to the filter increases, the suction power of the motor becomes lowered, and the motor is overloaded because the clogged filter blocks the air flow.

SUMMARY OF THE INVENTION

It is an object of the present invention to provide a vacuum cleaner able to effectively eliminate dirt and dust attached to a filter.

It is another object to provide a vacuum cleaner able to generate a cyclone type air current sucked into a dirt and dust collecting unit and rotating or trembling a clogged filter.

It is yet another object to provide a vacuum cleaner able to reduce the number of components for assembling a filter into the vacuum cleaner.

It is still another object to provide a vacuum cleaner able to prevent a motor from being low-efficiency.

It is a further object to provide a vacuum cleaner able to prevent a filter from being clogged.

It is also an object to provide a vacuum cleaner able to effectively separate dirt and dust from air.

These and other objects may be achieved by providing a vacuum cleaner including a body having open and closed spaces divided by a partition, a suction brush connecting port formed on an upper side of the body and interconnected with the open space, an interconnecting hole formed on the partition for interconnecting the open and closed spaces, a motor mounted in the closed space of the body for generating a suction force; and a dirt collecting section detachably mounted in the open space of the body for centrifugally separating dirt and dust contained in the air sucked in through the suction brush connecting port by the motor.

The dirt collecting section includes an outer casing having an air inlet and outlet which respectively correspond to the suction brush connecting port and the interconnecting hole, a cylindrical filter rotatably mounted on the outer casing by a rotational supporting member and having one closed end and a plurality of air holes which are formed along an outer circumference, at least four rotating wings formed on the filter for rotating the filter with air current which flows in through the air inlet, and a dirt collecting container detachably formed on the outer casing to enclose the filter.

The rotation supporting section includes a plurality of steel balls inserted in ball holes of a flange portion which is outwardly and perpendicularly bent from the open end of the filter, a supporting plate having a filter positioning hole formed at the middle portion and connected to the outer casing, a first guiding groove formed adjacent to the filter positioning hole for movably supporting the steel balls, and a guiding ring fixed on the supporting plate and having a second guiding groove corresponding to the first guiding groove for movably supporting the steel balls.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
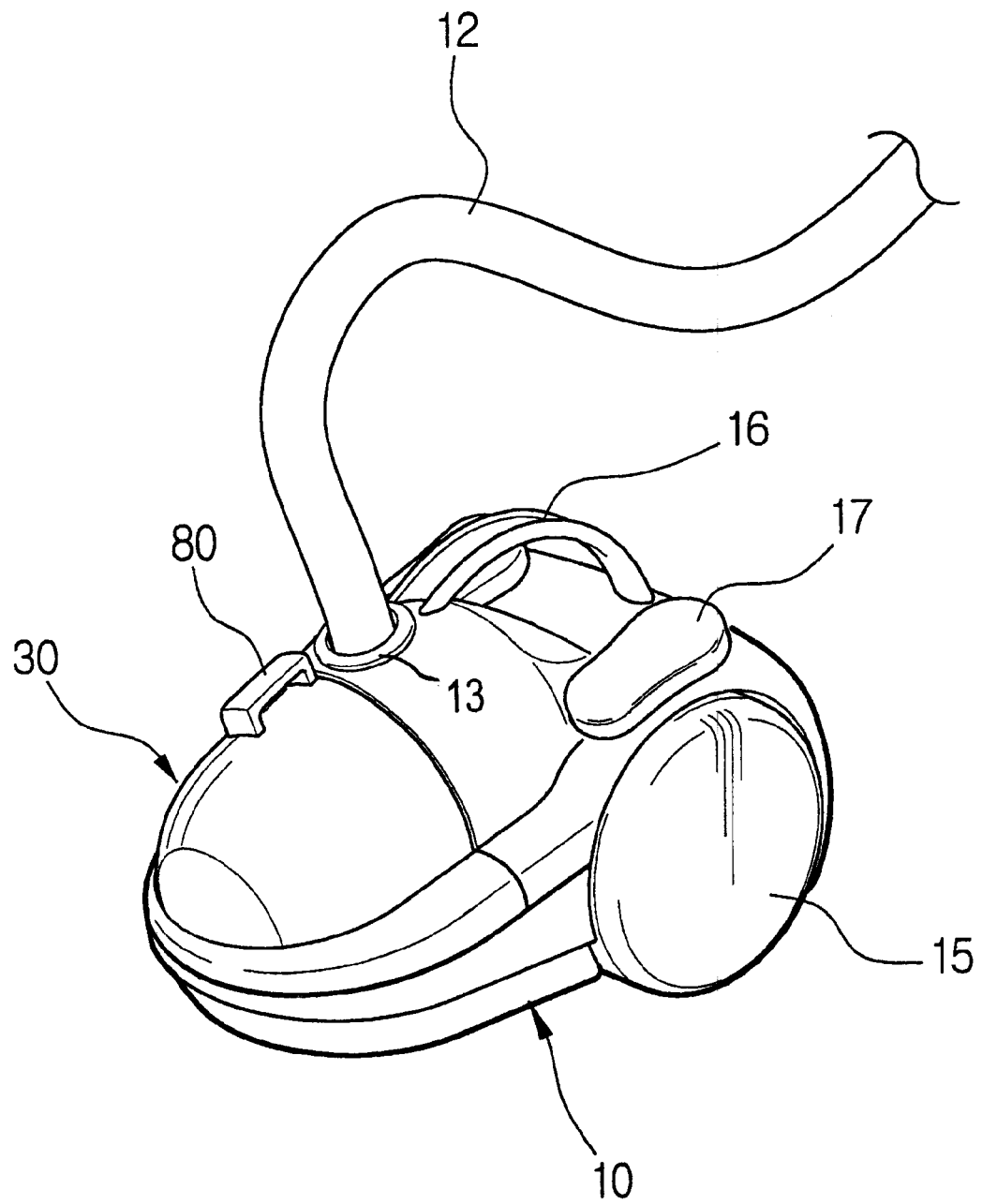
FIG. 1 is a perspective view for showing an appearance of a vacuum cleaner according to principle of the present invention.
Figure 2:
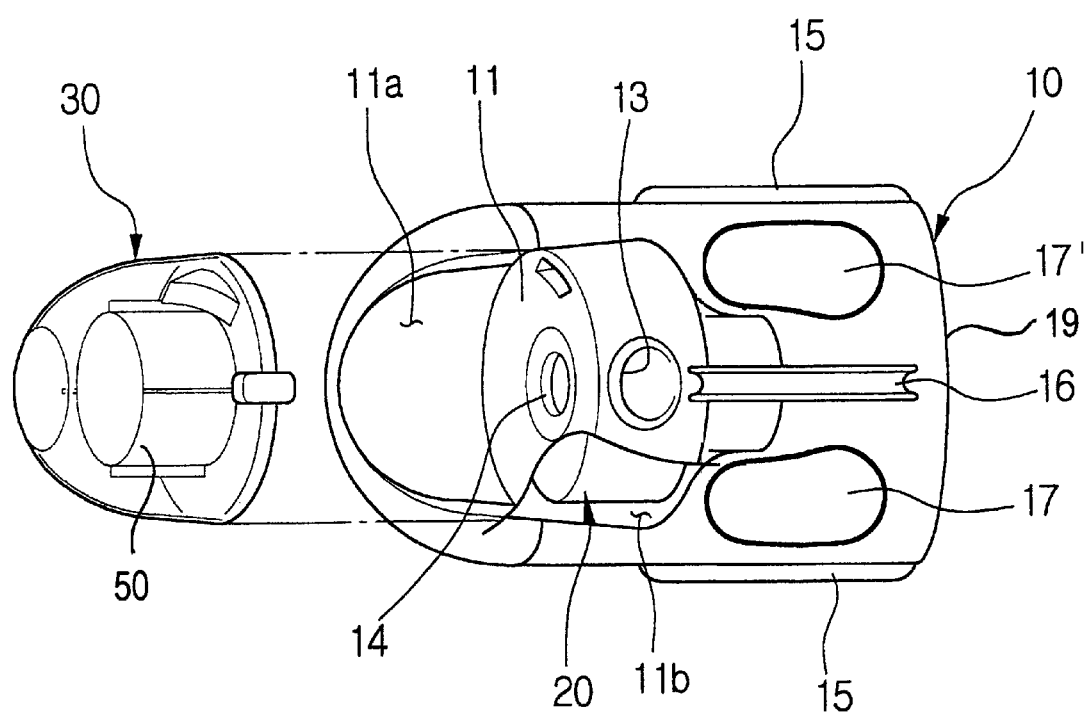
FIG. 2 is a partially exploded view showing a dirt collecting section of the vacuum cleaner.

Referring now to drawings, FIGS. 1 and 2, shows a vacuum cleaner including a body 10, a motor 20 installed in body 10, and a dirt collecting unit 30 detachably attached to body 10 and containing a filter 50. Body 10 of the vacuum cleaner is divided by a partition 11 into an open space 11a at one side of body 10, and a closed space 11b at the other side of body 10. Partition 11 having a circular shape includes a depression inwardly depressed toward closed space 11b. Open space 11a includes a positioning section substantially in a semi-sphere shape. Body 10 includes a connecting port 13 which is interconnected with the open space 11a and a suction brush hose 12. Partition 11 includes an interconnecting hole 14 formed on a central portion of partition 11 for interconnecting open and closed spaces 11a and 11b. A pair of wheels 15 are formed on both sides of body 10 for movement of body 10 on a floor. Rollers connected to wheels are rotatably attached to a lower surface of body 11 for rotation of wheels 15 and the movement of body 10. A handle 16 is formed on a middle upper portion of body 10, and a pair of operating buttons 17 and 17' are formed on both sides of the handle 16. One operating button 17 is a power-on button while the other operating button 17' is a cord reeling button. A discharging hole 19 is formed on a rear end of closed space 11b of body 11, and a grill is arranged at the discharging hole 19.

Motor 20 is mounted in the closed space 11b of body 10 and adjacent to partition 11 for generating a suction force.

Outside air is sucked into body 10 through suction brush hose 12 and connecting port 13 and is discharged outward through discharging hole 19 formed on a rear end of closed space 11b of body 10 via dirt collecting unit 30. The outside air sucked inside dirt collecting unit located in open space 11a of body 11 passes through filter 50, interconnecting hole 14 of partition 11, and discharging hole 19. During this process, dust and dirt contained in the outside air are separated by filter 50 and dirt collecting unit 30, and the cleaned air is discharged to the outside of body 10.

Figure 3:
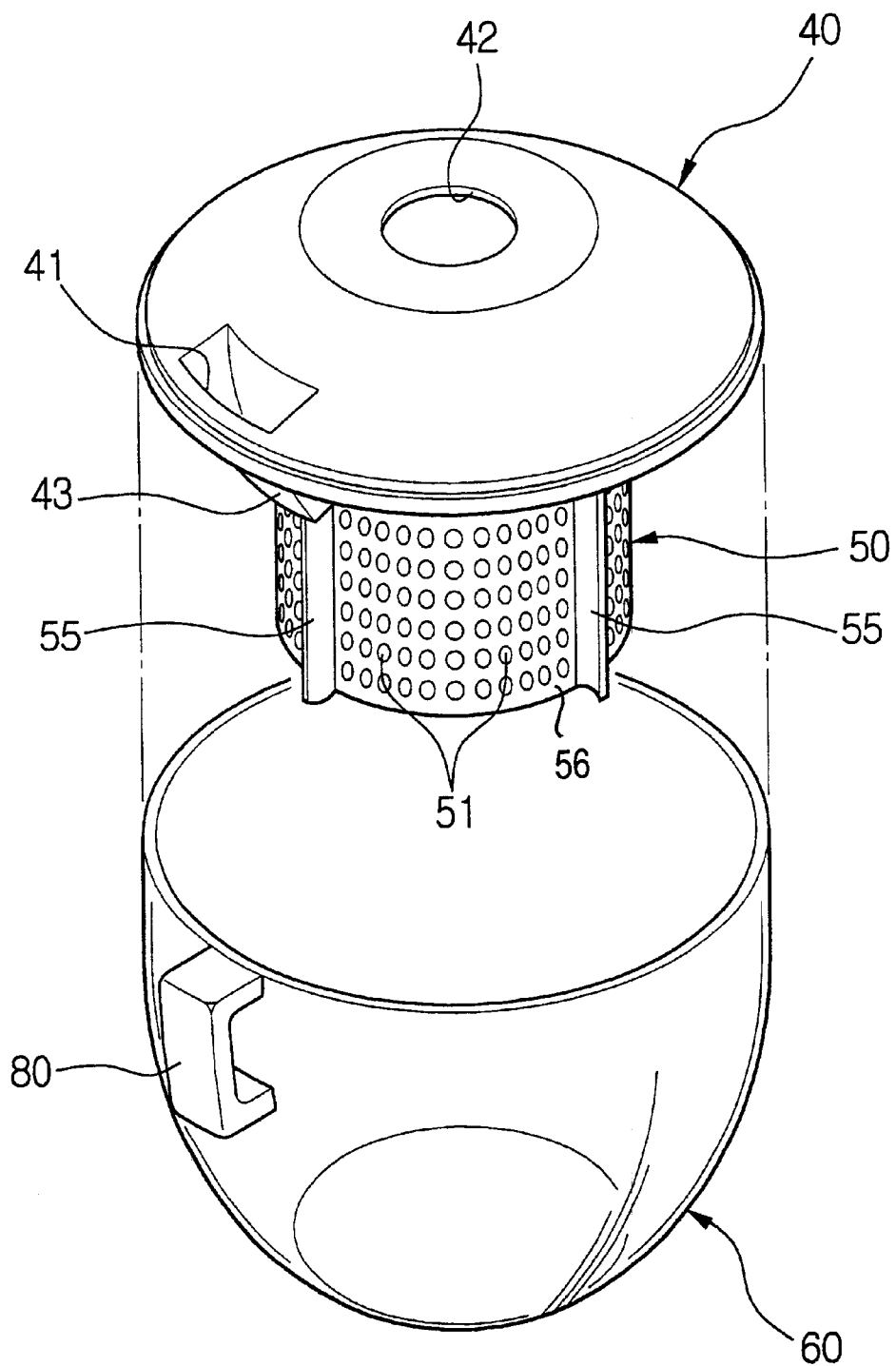
FIG. 3 is an exploded view showing the dirt collecting section and an outer casing of the vacuum cleaner.
Figure 4A:
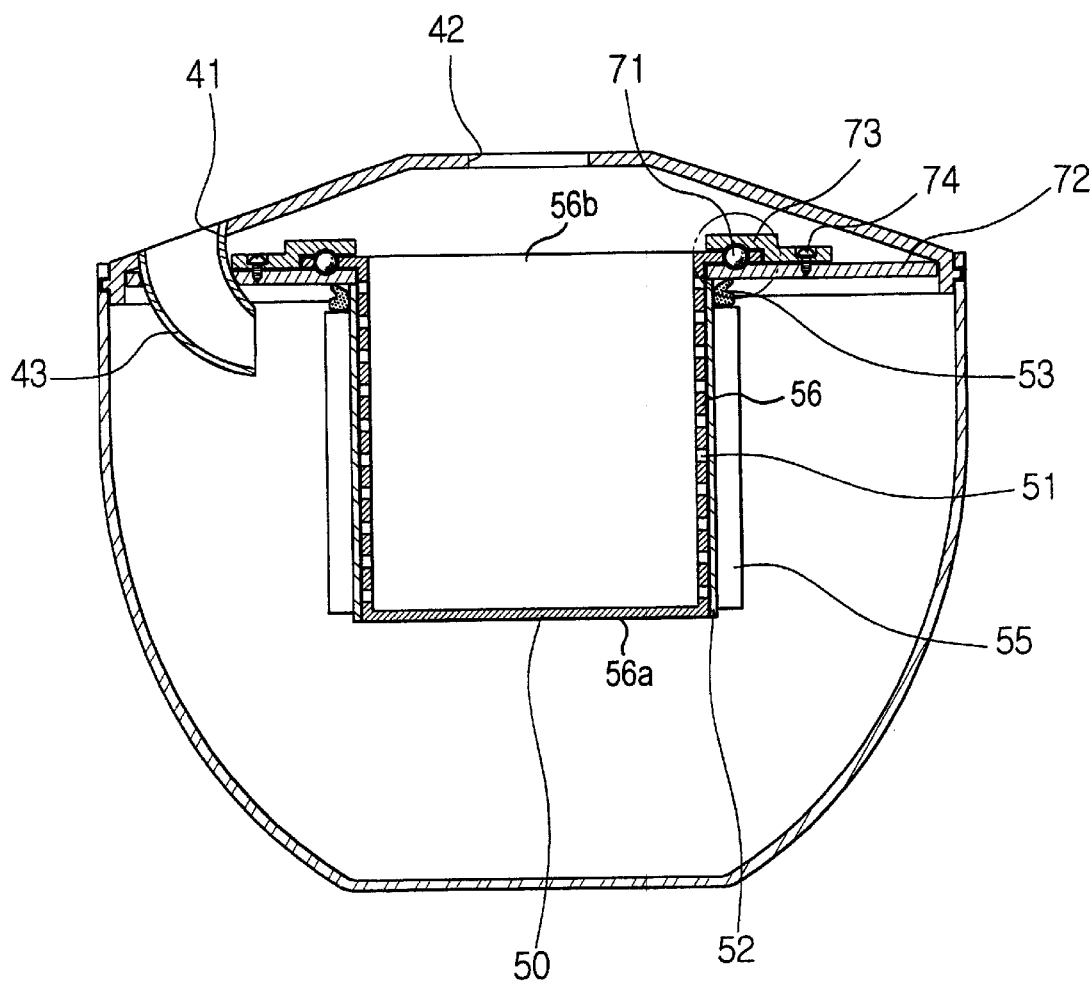
FIG. 4A is a sectional view for showing the dirt collecting section and a filter.
Figure 4B:
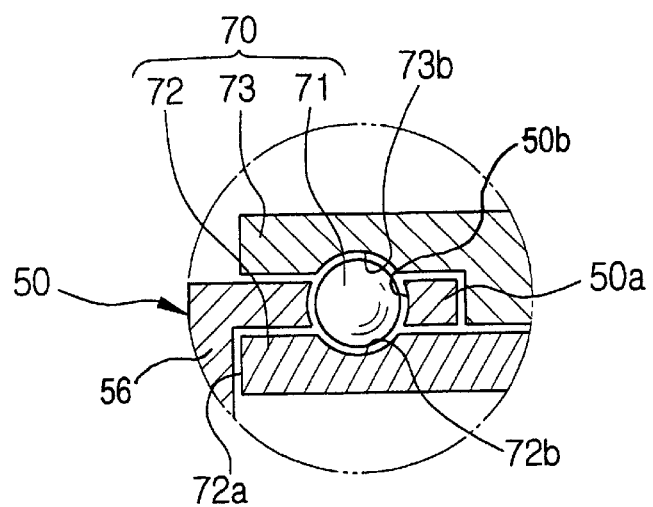
FIG. 4B is a detailed view of a circled area A of FIG. 4A.

Dirt collecting unit 30 accommodates the dust and dirt from the outside air from filter 50. Dirt collecting unit 30 includes an outer casing 40, filter 50, and a dirt collecting container 60 as shown in FIGS. 3, 4A, and 4B. Outer casing 40 includes an air inlet 41 corresponding to connecting port 13 of body 10 and an air outlet 42 corresponding to the interconnecting hole 14 of the body 10. Outer casing 40 is in the shape of a cone to correspond with the depression of partition 11 of body 10. Air inlet 41 is connected with a guiding port 43 for obliquely guiding the air from air inlet 41 toward dirt collecting container 60. Accordingly, the air sucked in between filter 50 and dirt collecting container 60 forms a circular air current circulating around filter 50.

Filter 50 is rotatably mounted on outer casing 40 and between dirt collecting container 60 and an air outlet 42 of outer casing 40 via a rotation supporting section 70. Filter 50 is of a cylindrical structure which has a cylindrical body 56 having an closed end 56a and an open end 56b. A plurality of air holes 51 are formed along an outer circumference of cylindrical body 56 for efficiently discharging the air while blocking larger particles of dirt and dust. Preferably, a non-woven fabric 52 is attached to the outer circumference of filter 50 for preventing minute dirt or dust particles from passing through air holes 51. Any other forms of textile or a sponge material may be used. Air holes 51 are either circular or elliptical shaped holes.

Rotation supporting section 70 includes a flange portion 50a outwardly extended from open end 56b of filter 50 in a perpendicular direction to the cylindrical body 56, ball holes 50b formed on flange portion 50a, a plurality of steel balls 71 inserted in ball holes 50b of flange portion 50a, a supporting plate 72 connected to outer casing 40 and having a filter positioning hole 72a formed at a central portion of supporting plate 72 and a first guiding groove 72b formed on a surface of supporting plate 72 facing flange portion 50a for movably supporting steel balls 71, and a guiding ring 73 fixed on supporting plate 72 and having a second guiding groove 73b aligned to correspond to the first guiding groove 72b for movably supporting steel balls 71. The number of steel balls 71 is in the range from 6 to 12. An outer circumference of supporting plate 72 is connected to the outer casing 40 while an inner circumference of filter positioning hole 72a of supporting plate 72 is disposed adjacent to an outer circumference of cylindrical body 56, and guiding ring 73 is spaced apart from supporting plate 72 and fixed on supporting plate 72 by a plurality of screws 74. Flange portion 50a is disposed between guiding ring 73 and supporting plate 72 while steel balls 71 inserted into ball hole 50b are disposed between first and second guiding grooves 72b and 73a. For a smooth rotation of filter 50, a gap is provided between filter positioning hole 72a of supporting plate 72 and filter 50. Guiding ring 73 and supporting plate 72 are in contact with each other at a certain clearance from each other. In order to prevent a reverse current of dirt and dust generated through the gap introduced from an inside of filter, a sealing member 53 is disposed around the outer circumference of filter 50.

Along the outer circumference of filter 50, a plurality of rotating wings 55 are formed at equal intervals to rotate filter 50 by the air current sucked into dirt collecting unit 30 through guiding port 43 formed on outer casing 40. Although there are four rotating wings 55 in the drawing, it is not strictly limited thereto, but can be modified into any number of rotating wings 55 able to rotate filter 50 by the air current. Rotating wings 55 may be simply fitted into fixing slots formed on filter 50 or attached to cylindrical body 56 and are bent toward a direction able to receive rotation force from the air current in consideration of the direction of the air current.

Figure 5:
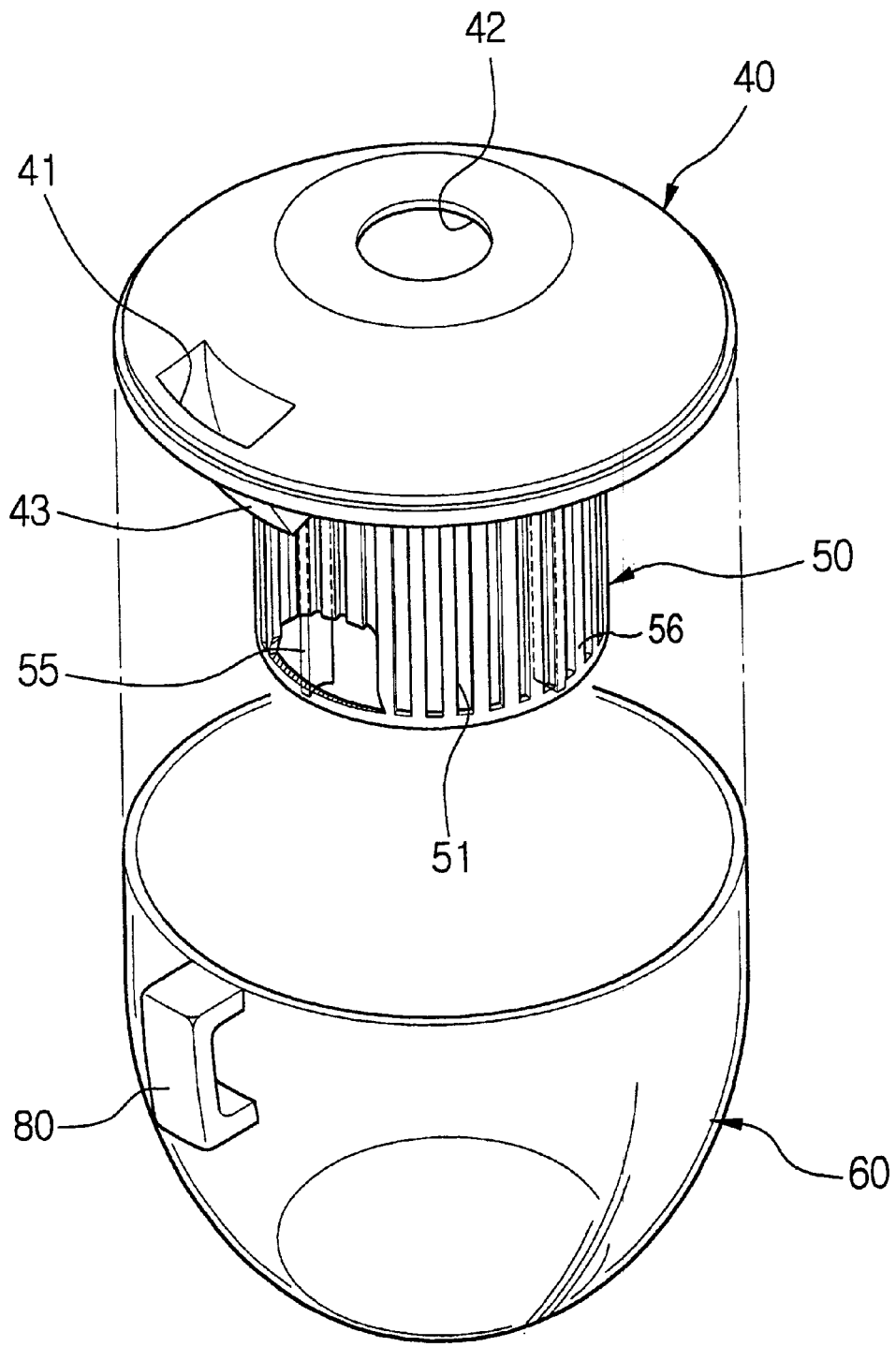
FIG. 5 is an exploded perspective view showing the dirt collecting section of the vacuum cleaner according to another embodiment of the present invention.

As shown in FIG. 5, rotating wings 55 may be disposed on an inner circumference of filter 50 at the same position and by the same method described above. In this case, rotating wings 55 help the filter 50 to be rotated efficiently by the air current. Since rotating wings 55 are disposed along the inner circumference of filter 50, the shape of airholes 51 formed on filter 50 is changed to a form of slot having certain widths which are lengthwise extended along cylindrical body 56 of filter 50. Rotating wings 55 are also bent toward a direction oblique to the direction of the air current for more efficient rotation of filter 50.

Dirt collecting container 60 is substantially in a semispheric shape and is detachably mounted on outer casing 40. Dirt collecting container 60 forms a circular air current with the air sucked thereinto and collects dirt and dust which are separated from the air and drop by the centrifugal force generated from the circular air current. It is preferable that dirt collecting container 60 is made of a transparent or translucent material to enable a user to check the level of collected dirt and dust in dirt collecting container 60. A handle 80 is integrally formed at a middle portion of the upper end of dirt collecting container 60 for handling of dirt collecting section 30.

In the vacuum cleaner constructed as above according to the present invention, by a tight coupling of the depression formed on partition 11 of body 10 with the cone-shaped portion formed on outer casing 40 of dirt collecting section 30, dirt collecting unit 30 is smoothly mounted on the body 10 of the vacuum cleaner. Suction brush connecting port 13 of body 10 is connected with suction brush hose 12.

Accordingly, as the motor 20 operates, dirt and dust contained in the outside air are sucked in through suction brush connecting port 13 along with the air. The air containing dirt and dust then flows into dirt collecting section 30 through suction brush connecting port 13, air inlet 41 formed on outer casing 40, and guiding port 43. The air obliquely flows into dirt collecting container 60 due to guiding port 43, and accordingly, there is formed the circular air current in dirt collecting container 60 to centrifugally separate various kinds of dirt and dust from the air. Simultaneously, by the movement of the air flowing into rotating wing 55 through the guiding port 43, filter 50 is rotated, and accordingly, dirt and dust are prevented from clinging to the outer circumference of filter 50 due to the rotation or trembling of filter 50, and the filtering effect of the filter 50 is maximized.

Once being separated from the air, dirt and dust fall into dirt collecting container 60, and the cleaned air is discharged out through discharging hole 19 of body 10 via both air outlet 42 formed on outer casing 40 of dirt collecting section 30 and interconnecting hole 14 formed on partition 11 of body 10.

When the amount of dirt and dust accumulate to a certain quantity in dirt collecting container 60, the user recognizes the accumulated amount of dirt and dust through the transparent or translucent portion of dirt collecting container 60. Accordingly, the user can empty dirt collecting container 60 in time. According to the present invention, by simply pushing the upper portion of dirt collecting container 60, the dirt collecting section 30 can be easily separated from body 10 of vacuum cleaner.

The air containing dust and dirt is sucked in through the suction port into the dirt collecting container in an oblique direction in order to form a circular air current around the filter in the dirt collecting container. Accordingly, larger dirt or dust particles are separated by centrifugal force and filtered out through the filter by the upturning circular air current. Since the rotating fan and the filter are rotated by the air current, more effective circular air current is formed in the dirt collecting container, the dust and dirt do not cling to the filter.

As described above, in the vacuum cleaner according to the present invention, the filter is rotated by a simple structure and effectively removes the clogged dirt and dust from the filter, and the whole structure of the vacuum cleaner is also simplified. Accordingly, handling and use of the vacuum cleaner become easier, and due to a reduced number of components and a simpler structure, the manufacturing process is simplified while the manufacturing costs is decreased.

As stated above, a preferred embodiment of the present invention is shown and described. Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. A vacuum cleaner comprising:
   a main body having a port and a first hole;
   a dirt collecting unit detachably mounted within said main body, said dirt collecting unit having an inlet and an outlet, said inlet communicating with said port, said outlet communicating with said first hole;
   a filter comprising a filtering body having an opening in a direction of said outlet and a closed bottom, at least one vane formed on said filtering body, and a flange outwardly and transversely bent from said opening, said flange having a second hole;
   a plate fixed to said dirt collecting unit, said plate having a third hole receiving said filtering body and supporting said flange, said plate having a first groove;
   a ring attached to said plate, said ring having a portion spaced apart from said plate, said flange positioned in said portion, said ring having a second groove corresponding to said first groove, said first groove and said second groove making a route, said flange being free to rotate relative to said plate and said ring;
   a bearing inserted into said second hole and positioned between said first groove and said second groove, said bearing moving along said route; and
   a guiding member connected to said inlet and disposed between said vane and said inlet, said guiding member guiding an air from said inlet to said vane.

2. The vacuum cleaner of claim 1, further comprising a motor mounted within said main body, said motor sucking the air from said port through said inlet, said guiding member, said filter, and said outlet and discharging the air through said first hole.

3. The vacuum cleaner of claim 2, further comprised of:
   said dirt collecting unit comprising an outer casing and a container, said outer casing detachably attached to said main body, said outlet of said dirt collecting unit formed in said outer casing, said container detachably attached to said outer casing; and
   said plate fixed to said outer casing of said dirt collecting unit.

4. The vacuum cleaner of claim 3, wherein said main body has a partition to divide said main body into a first chamber and a second chamber, said partition has a fourth hole corresponding to said outlet, said first chamber communicates with said second chamber through said fourth hole, said dirt collecting unit is detachably mounted within said first chamber, and said motor is mounted within said second chamber.

5. The vacuum cleaner of claim 1, wherein said bearing and said second hole are comprised of at least six bearings and six second holes, respectively.

6. The vacuum cleaner of claim 1, further comprising a sealing member disposed between said filter and said plate for preventing leakage of a foreign material into a gap between said filter and said plate.

7. The vacuum cleaner of claim 1, said filter further comprising a non-woven fabric attached to an outer surface of said filtering body.

8. The vacuum cleaner of claim 1, further comprising a plurality of vanes formed on said filter at equal intervals in a longitudinal direction.

9. The vacuum cleaner of claim 8, said vanes formed on one of an inner circumference and an outer circumference of said filter.

10. The vacuum cleaner of claim 7, a shape of said plurality of holes being one of a circle, an ellipse, and a slot.

11. The vacuum cleaner of claim 1, wherein said guiding member obliquely guides the air from said inlet to said vane.

12. A vacuum cleaner, comprising:
   a main body comprising a partition and a motor, said partition dividing said main body into an open section and a closed section, said partition having an interconnecting hole interconnecting said open section and said closed section, a discharging hole, and a connecting port communicating with said open section, said motor generating a force for sucking air from said connecting port;
   a dirt collecting unit detachably attached to said main body, said dirt collecting unit having an outlet communicating with said interconnecting hole, and an inlet;
   a filter separating a foreign material from air sucked from said inlet, said filter comprising a filtering body having an opening end and a closed end, at least one vane formed on the side of said filtering body, and a flange outwardly and perpendicularly bent from said open end, said flange having a ball hole;
   a rotation supporter comprising:
      a ball positioned in said ball hole,
      a supporting plate fixed to said dirt collecting unit, said supporting plate having a filter positioning hole and a first guiding groove; and
      a guiding ring attached to said supporting plate, said guiding ring having a portion spaced apart from said supporting plate, said guiding ring having a second guiding groove corresponding to said first guiding groove, said flange rotatably inserted between said supporting plate and said portion of said guiding ring, said first and second guiding grooves forming a route for guiding said ball; and a guiding member connected to said inlet, said guiding member guiding the air from said inlet to said vane so that the air rotates said filter.

13. The vacuum cleaner of claim 12, wherein said guiding member obliquely guides the air from said inlet to said vane.

14. The vacuum cleaner of claim 12, said dirt collecting unit comprising an outer casing detachably attached to said open portion of said main body, and a container detachably attached to said outer casing.

15. The vacuum cleaner of claim 12, said filter comprising a plurality of holes and a non-woven fabric attached to an outer surface of said filter.

16. The vacuum cleaner of claim 12, further comprising a sealing member disposed between said filter and said dirt collecting unit for preventing leakage of a foreign material into said filter.

17. A vacuum cleaner comprising:

a main body having a port and a first hole;

a dirt collecting unit removably mounted in said main body, said dirt collecting unit comprising a container and a cover, said container having a first opening, said cover removably covering said first opening, said cover having an inlet and an outlet, said inlet communicating with said port, said outlet communicating with said first hole;

a filter comprising a filtering body having a second opening in a direction of said outlet, a vane, and a flange outwardly and transversely bent from said second opening;

a plate attached to said cover, said plate having a second hole receiving said filtering body which is spaced apart from a bottom of said container, said plate supporting said flange of said filter free to rotate relative to said plate; and a guide connected to said inlet to communicate with said inlet, said guide guiding an air from said inlet to said vane so that a swirling current is formed within said dust collecting unit and said swirling current hits said vane to rotate said filter when the air is drawn between said inlet and said outlet.

18. The vacuum cleaner of claim 17, further comprised of:

said flange having a third hole and a bearing positioned in said third hole;

said plate having a first groove; and a ring attached to said plate, said ring having a portion spaced apart from said plate, said flange rotatably inserted in said portion of said ring, said ring having a second groove corresponding to said first groove, said first groove and said second groove making a route for said bearing.

19. The vacuum cleaner of claim 17, said container being made of a transparent material.

20. The vacuum cleaner of claim 17, said vane bent toward a direction of the air guided by said guide.

21. A method for separating a dust from air drawn into a vacuum cleaner comprising a container for collecting the dust, a cover covering said container, a filter rotatably attached to said cover and a vane formed on said filter, the method comprising the steps of:

drawing the dust contained in the air from an outside of the vacuum cleaner into an inside of the vacuum cleaner;

directing obliquely the drawn dust and air into said container through an inlet formed through said cover;

making a swirling momentum around said filter and imparting said momentum to said vane;

rotating said filter by said momentum;

filtering the dust from the air through said filter; and discharging the filtered air into an outlet formed through said cover and collecting the dust in said container.

22. The method of claim 21, wherein said step of drawing is performed by a motor disposed within the vacuum cleaner.

23. The method of claim 21, wherein said step of rotating comprises the step of rotating a bearing of said filter.

* * * * *